(12) United States Patent
Nishijima

(10) Patent No.: US 7,743,342 B2
(45) Date of Patent: Jun. 22, 2010

(54) MOVING-IMAGE ICON GENERATING APPARATUS

(75) Inventor: Masakazu Nishijima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 959 days.

(21) Appl. No.: 10/365,530

(22) Filed: Feb. 13, 2003

(65) Prior Publication Data

US 2003/0160777 A1    Aug. 28, 2003

(30) Foreign Application Priority Data

Feb. 27, 2002   (JP) ............................... 2002-050983

(51) Int. Cl.
G06F 3/048 (2006.01)

(52) U.S. Cl. ................... 715/836; 715/745; 715/762; 715/763; 715/810

(58) Field of Classification Search ............ 715/762, 715/763, 836, 837, 838, 839, 846, 847, 977, 715/708, 756, 766, 815, 861, 745, 810; 702/19; 707/100, 104.1; 382/243; 435/418; 345/581, 345/426

See application file for complete search history.

(56) References Cited

U.S. PATENT DOCUMENTS

| | | | | |
|---|---|---|---|---|
| 5,479,602 A | * | 12/1995 | Baecker et al. .............. | 715/838 |
| 5,745,713 A | * | 4/1998 | Ferguson et al. ............ | 715/716 |
| 5,831,617 A | * | 11/1998 | Bhukhanwala .............. | 715/839 |
| 7,003,736 B2 | * | 2/2006 | Kanevsky et al. ........... | 715/837 |
| 2003/0020762 A1 | * | 1/2003 | Budrys et al. ................ | 345/835 |

FOREIGN PATENT DOCUMENTS

| | | |
|---|---|---|
| JP | 6-4258 | 1/1994 |
| JP | 8-115199 | 7/1996 |
| JP | 2002-050983 | 2/2002 |

OTHER PUBLICATIONS

Tonomura et al. "Content Oriented Visual Interface Using Video Icons for Visual Database Systems", IEEE, pp. 68-73, 1989.*
Japanese Office Action and Notification of Reasons for Refusal dated May 16, 2006, and English Translation thereof.

* cited by examiner

Primary Examiner—Weilun Lo
Assistant Examiner—Tuyetlien T Tran
(74) Attorney, Agent, or Firm—McGinn IP Law Group PLLC

(57) ABSTRACT

The sizes of icons for moving images (the size of a rectangle on the front side of each icon, the length of each icon in the depth direction thereof, etc.) that specify moving-image files are changed depending upon file information (moving image playback times, image sizes of the frames that make up the moving images, sizes of the moving-image files, etc.) concerning the moving-image files specified by the icons for the moving images. The content of each moving-image file can be ascertained by observing the icon for its moving image.

12 Claims, 6 Drawing Sheets

*Fig. 4*

FILE INFORMATION

| MOVING-IMAGE FILE NAME | IMAGE SIZE | PLAYBACK TIME | MOVING-IMAGE FILE SIZE | FRAME RATE (COMPRESSION RATE) |
|---|---|---|---|---|
| MOVING-IMAGE 1. AVI | 320 x 240 | 90 sec. | 4 MB | 10 |
| MOVING-IMAGE 2. AVI | 240 x 160 | 120 sec. | 6 MB | 10 |
| MOVING-IMAGE 3. AVI | 400 x 300 | 150 sec. | 10 MB | 20 |
| MOVING-IMAGE 4. AVI | 420 x 320 | 200 sec. | 10 MB | 30 |
| MOVING-IMAGE 5. AVI | 400 x 300 | 300 sec. | 15 MB | 20 |

MOVING-IMAGE ICON GENERATING APPARATUS

BACKGROUND OF THE INVENTION

1. Field of the Invention

This invention relates to an apparatus for generating icons for moving images.

2. Description of the Related Art

Figures referred to as icons for identifying software and files stored on the hard disk of a personal computer are displayed on the display screen of a display unit connected to the personal computer. Clicking on such an icon launches the software identified by the clicked icon or displays the content (text, image, etc.) represented by the file.

If such an icon is a file icon, often the icon corresponds to the software that created the file and does not express the content represented by the file.

SUMMARY OF THE INVENTION

Accordingly, an object of the present invention is to so arrange it that the content of a file for a moving can be ascertained by looking at the file icon.

According to a first aspect of the present invention, the foregoing object is attained by providing an apparatus for generating icons for moving images, comprising a decision device (decision means) for deciding at least one of the shape and color of a moving-image icon, which identifies a moving-image file, based upon the size of the image of each frame constituting a moving image represented by moving-image data that has been stored in the moving-image file; and a generating device (generating means) for generating data representing a moving-image icon having at least one of the shape and color decided by the decision device.

The present invention may be adapted so as to provide a control method suited to the above-described apparatus for generating icons for moving images. Specifically, the method comprises the steps of deciding at least one of the shape and color of a moving-image icon, which identifies a moving-image file, based upon the size of the image of each frame constituting a moving image represented by moving-image data that has been stored in the moving-image file; and generating data representing a moving-image icon having at least one of the shape and color decided.

According to the first aspect of the present invention, the shape and/or color of an icon for a moving image is decided based upon the size of the image of each frame constituting the moving image. Data representing this moving-image icon having the decided shape and/or size is generated. The generated icon data for the moving image is recorded on a recording medium, on which the moving-image file has been stored, in association with the corresponding moving-image file.

The moving-image icon represented by the thus generated data of this moving-image icon is displayed on the display screen of the display device. By observing the displayed moving-image icon, one can ascertain the size of the image of each frame constituting the moving image.

It may be so arranged that the decision device decides one of at least the shape and color of each of a plurality of moving-image icons based upon a plurality of moving-image files and the maximum size and minimum size among the sizes of images of frames constituting moving images representing moving-image data that has been stored in the plurality of moving image files.

According to a second aspect of the present invention, the foregoing object is attained by providing an apparatus for generating icons for moving images, comprising a decision device (decision means) for deciding at least one of the shape and color of a moving-image icon, which identifies a moving-image file in which moving-image data has been stored, based upon the compression rate of the moving-image data; and a generating device (generating means) for generating data representing a moving-image icon having at least one of the shape and color decided by the decision device.

The present invention may be adapted so as to provide a control method suited to the above-described apparatus for generating icons for moving images. Specifically, the method comprises the steps of deciding at least one of the shape and color of a moving-image icon, which identifies a moving-image file in which moving-image data has been stored, based upon the compression rate of the moving-image data; and generating data representing a moving-image icon having at least one of the shape and color decided.

According to the second aspect of the present invention, the shape and/or color of an icon for a moving image is decided based upon the compression rate of moving-image data. Data representing the moving-image icon having the shape and/or size decided is generated.

The moving-image icon represented by the thus generated data of this moving-image icon is displayed on the display screen of the display device. By observing the displayed moving-image icon, one can ascertain the compression rate of the moving-image data, namely the image quality of the moving image, at a glance.

Programs for implementing the above methods and recording media on which the programs have been stored can may be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table illustrating file information;

DESCRIPTION OF THE PREFERRED EMBODIMENTS

Preferred embodiments of the present invention will now be described in detail with reference to the drawings.

Figure 1:
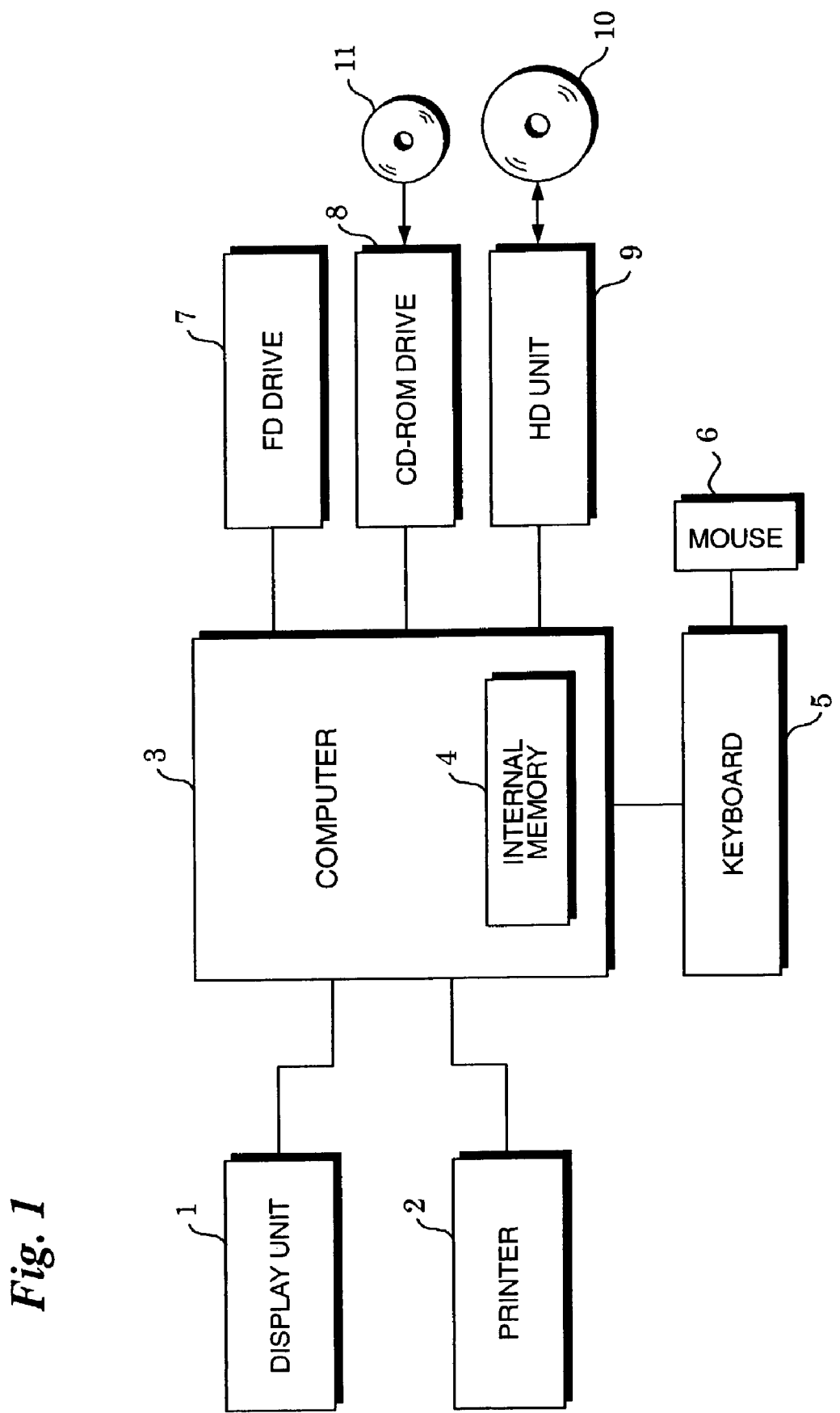
FIG. 1 is a block diagram illustrating the electrical structure of a computer system.

FIG. 1 is a block diagram illustrating the configuration of a computer system according to a preferred embodiment of the present invention.

The computer system includes a computer 3 to which a display unit 1, printer 2 and keyboard 5 are connected. A mouse 6 is connected to the computer 3 via a keyboard 5. A floppy disk (FD) drive 7, a compact disc-read-only memory (CD-ROM) drive 8 and a hard disk (HD) unit 9 are connected to the computer 3. The FD drive 7 writes data to and reads data from a floppy disk (not shown). The CD-ROM drive 8 reads data and programs, etc., out of a CD-ROM 11. The HD unit 9 writes data (files) to and reads data from a hard disk 10. The computer 3 includes an internal memory 4.

The system is operated in the manner described later by reading a program stored on the CD-ROM 11 out of the CD-ROM 11 using the CD-ROM drive 8.

Figure 2:
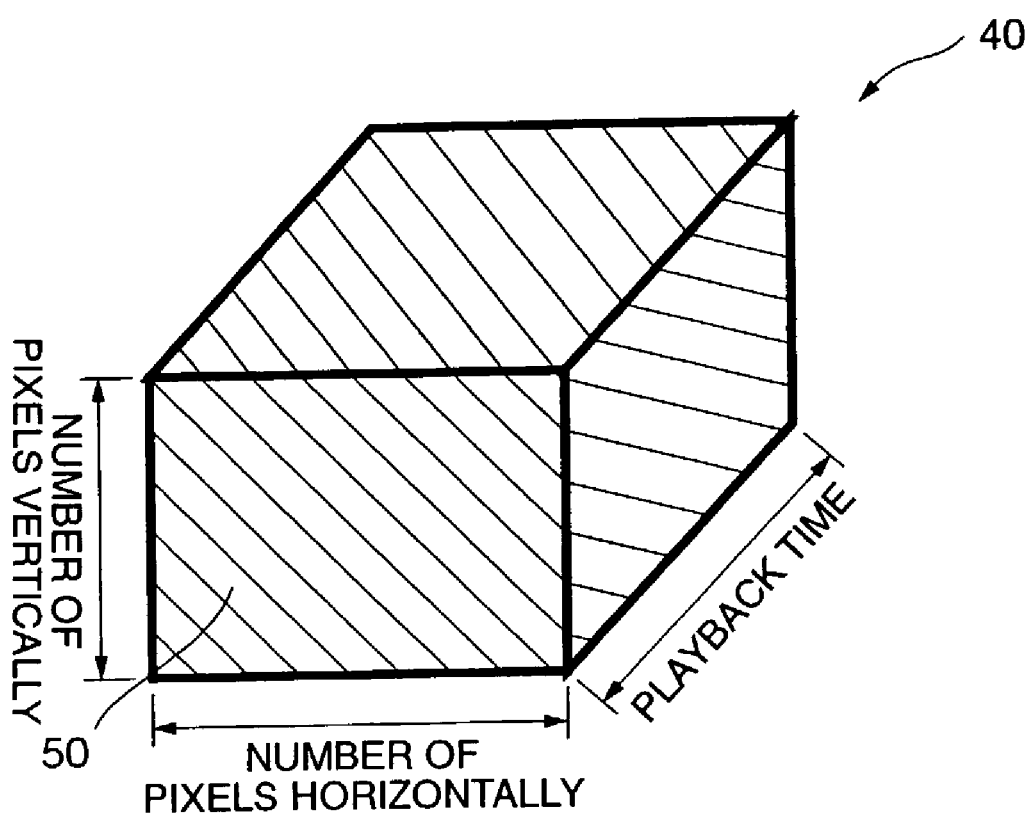
FIG. 2 is a diagram illustrating an example of an icon for a moving image.

FIG. 2 illustrates an example of an icon for a moving image.

The computer system according to this embodiment is such that the shape (size) and lightness (color) of a moving-image icon 40 that identifies a moving-image file are decided in dependence upon the characteristics of the image represented by this moving-image file. The moving-image icon 40 has the shape of a rectangular parallelepiped represented in two dimensions. A rectangle 50 constituting the front face of the moving-image icon 40 corresponds to the image size of the frames constituting a moving image represented by the corresponding moving-image file. The length of the side of the rectangle 50 in the horizontal direction is decided in accordance with the number of horizontally directed pixels of each frame constituting the moving image, and the length of the side of the rectangle 50 in the vertical direction is decided in accordance with the number of vertically directed pixels of each frame constituting the moving image.

The length of the moving-image icon 40 represented by the rectangular parallelepiped in the depth direction corresponds to playback time. The longer the playback time, the greater the length in the depth direction. Furthermore, the lightness of the moving-image icon 40 changes depending upon the size of the moving-image file. The larger the size of the moving-image file, the darker the moving-image icon 40; the smaller the size of the moving-image file, the brighter the moving-image icon 40. (In FIG. 2, the degree of lightness is indicated by hatching. The smaller the hatching spacing, the darker the moving-image icon; the greater the hatching spacing, the brighter the moving-image icon.)

Thus, in accordance with the characteristics of the moving-image file, the shape and lightness of the corresponding moving-image icon 40 change. This means that merely observing the moving-image icon 40 allows one to grasp the content of the moving image that corresponds to the moving-image icon 40.

Figure 3:
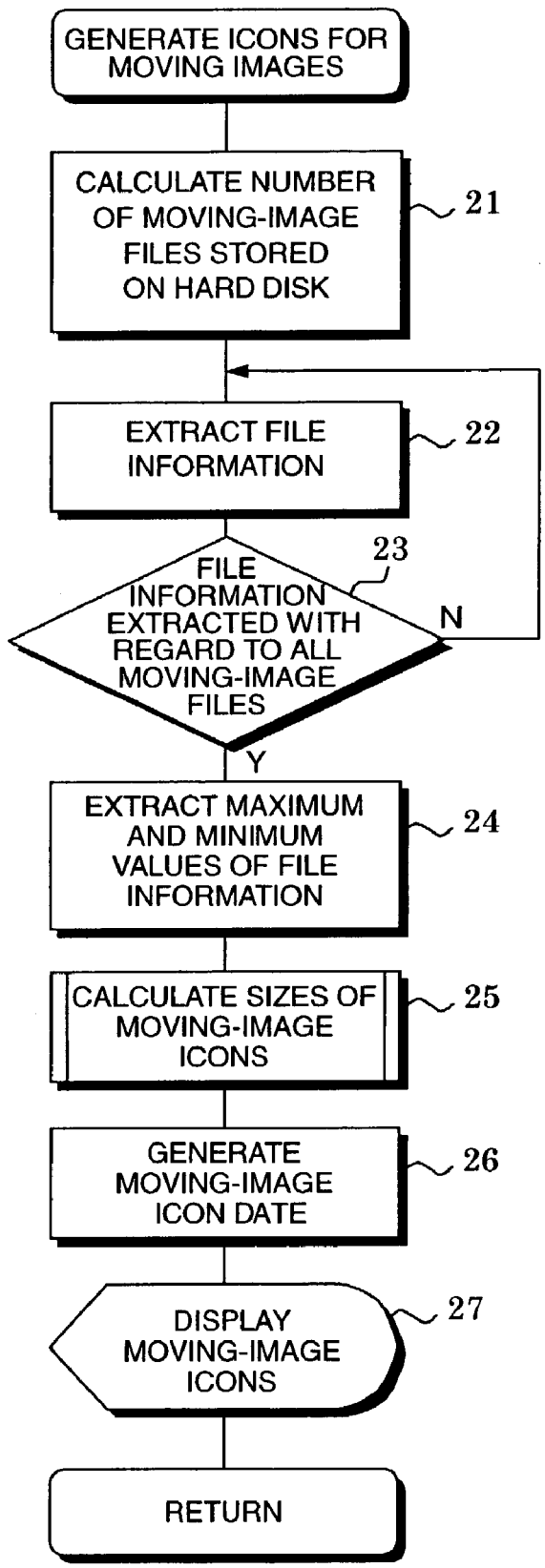
FIG. 3 is a flowchart illustrating processing for generating an icon for a moving image.
Figure 5:
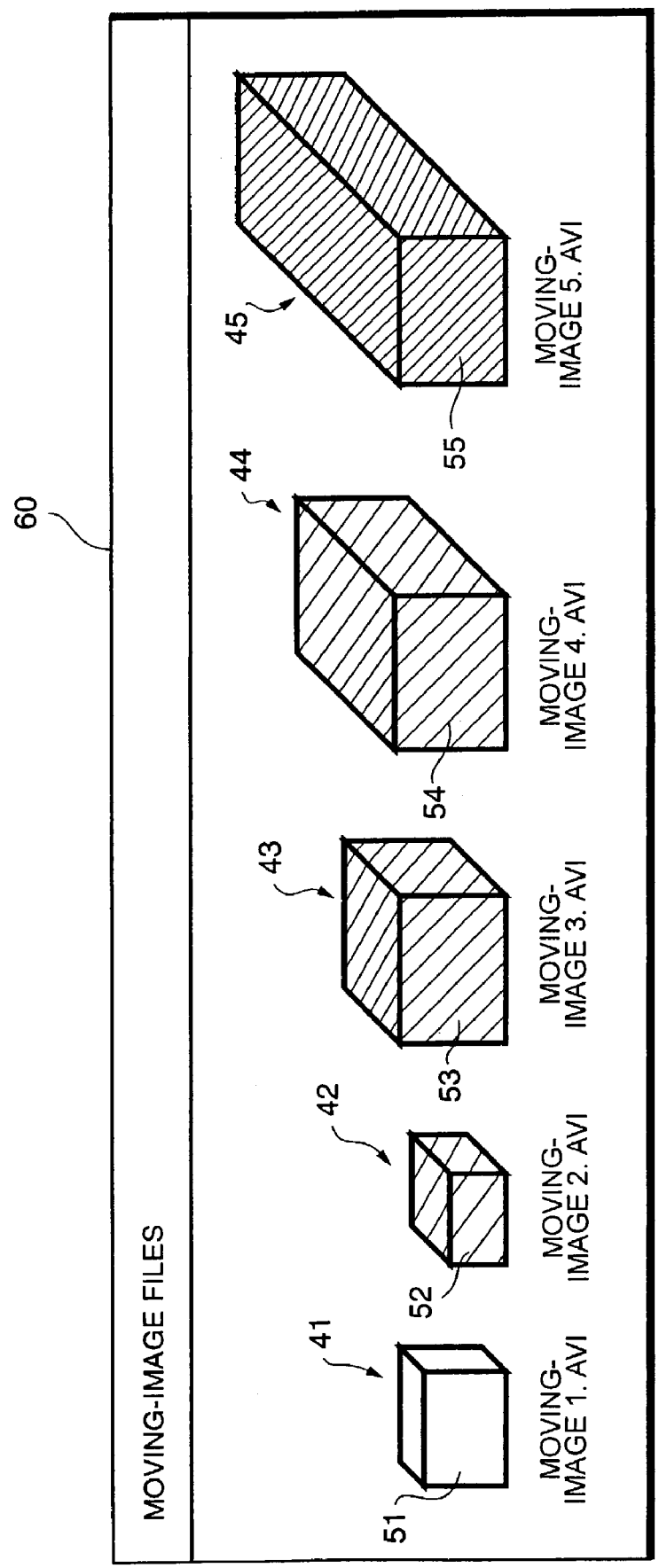
FIG. 5 is a diagram illustrating an example of displayed icons for moving images.

FIG. 3 is a flowchart illustrating processing for generating an icon for a moving image, FIG. 4 is a table illustrating file information on moving-image files that have been stored on the hard disk 10 of the computer system, and FIG. 5 is a diagram illustrating an example of a window displayed on the display screen of the display unit of the computer system.

First, the number of moving-image files among the files that have been stored on the hard disk 10 is calculated (step 21). In this embodiment, it is assumed that five moving-image files, namely files having moving-image file names "MOVING IMAGE 1.AVI" to "MOVING IMAGE 5.AVI", have been stored on the hard disk 10.

The file information of the moving-image files is extracted with regard to all moving-image files that have been stored on the hard disk 10 (steps 22, 23). One example of the extracted file information is illustrated in FIG. 4.

As shown in FIG. 4, the file information includes the names of moving-image files, the image sizes (number of pixels horizontally×number of pixels vertically) of the images of each of the frames constituting the moving images represented by the moving-image files, the playback times of the moving images, the sizes (amounts of data) of the moving-image files, and the frame rates (number of frames reproduced per second, the frame rate representing the compression rate of the corresponding moving-image file).

With reference again to FIG. 3, the maximum and minimum values of each of the items of file information of all of the moving-image files are extracted (step 24). More specifically, the maximum and minimum values of the numbers of pixels in the horizontal direction of image size, of the numbers of pixels in the vertical direction of image size, of the playback times, of the moving-image file sizes and of frame rates (numbers of image frames per second) are extracted from respective ones of the moving-image files. The sizes of icons for the moving images are calculated using the extracted maximum and minimum values (step 25). Processing for calculating the size of a moving-image icon will be described later. Moving-image icon data for displaying moving-image icons is generated using the calculated sizes of the moving-image icons (step 26). The generated moving-image icon data is applied to the hard disk 10, where the data is recorded in a form linked to the corresponding moving-image files. The moving-image icons are displayed on the display screen of the display unit 1 (step 27).

As shown in FIG. 5, a window 60 is displayed on the display screen of the display unit 1, and all of the moving-image icons 41 to 45 corresponding to the all of the moving-image files that have been stored on the hard disk 10 are displayed within the window 60. Of course, it goes without saying that it may be so arranged that the moving-image icons 41 to 45 are simply displayed on the display screen of the display unit 1 without being displayed in the window 60. The moving-image file names 1.AVI to 5.AVI are displayed below the corresponding moving-image icons 41 to 45.

The sizes of the rectangles 51 to 55 on the front sides of the moving-image icons 41 to 45, respectively, correspond to the sizes of the images of the frames constituting the corresponding moving images, mentioned above. Further, the lengths of the moving-image icons 41 to 45 in the depth direction thereof correspond to the playback times of the associated moving images. Furthermore, the lightnesses of the moving-image icons 41 to 45 are decided by the corresponding moving-image file sizes. (As mentioned above, the greater the hatching spacing, the greater the brightness indicated. The icon 41, which has no hatching whatsoever, is the brightest.)

Since the above-described file information includes frame rate (compression rate) as well, it may be so arranged that the frame rate is reflected in the shape or lightness of the moving-image icons. For example, if frame rate is to be reflected in the moving-image icons 41 to 45 shown in FIG. 5, a reference color is decided and it is so arranged that color at a distance that represents the degree of departure from the reference color on a chromaticity diagram will correspond to the frame rate. The color thus decided is adopted as the color of the moving-image icon. Of course, it may be so arranged that frame information rather than file information concerning moving-image file size may be reflected in the moving-image icons. For example, the depth-wise length or the lightness of a moving-image icon may be decided so as to correspond to the frame rate.

Figure 6:
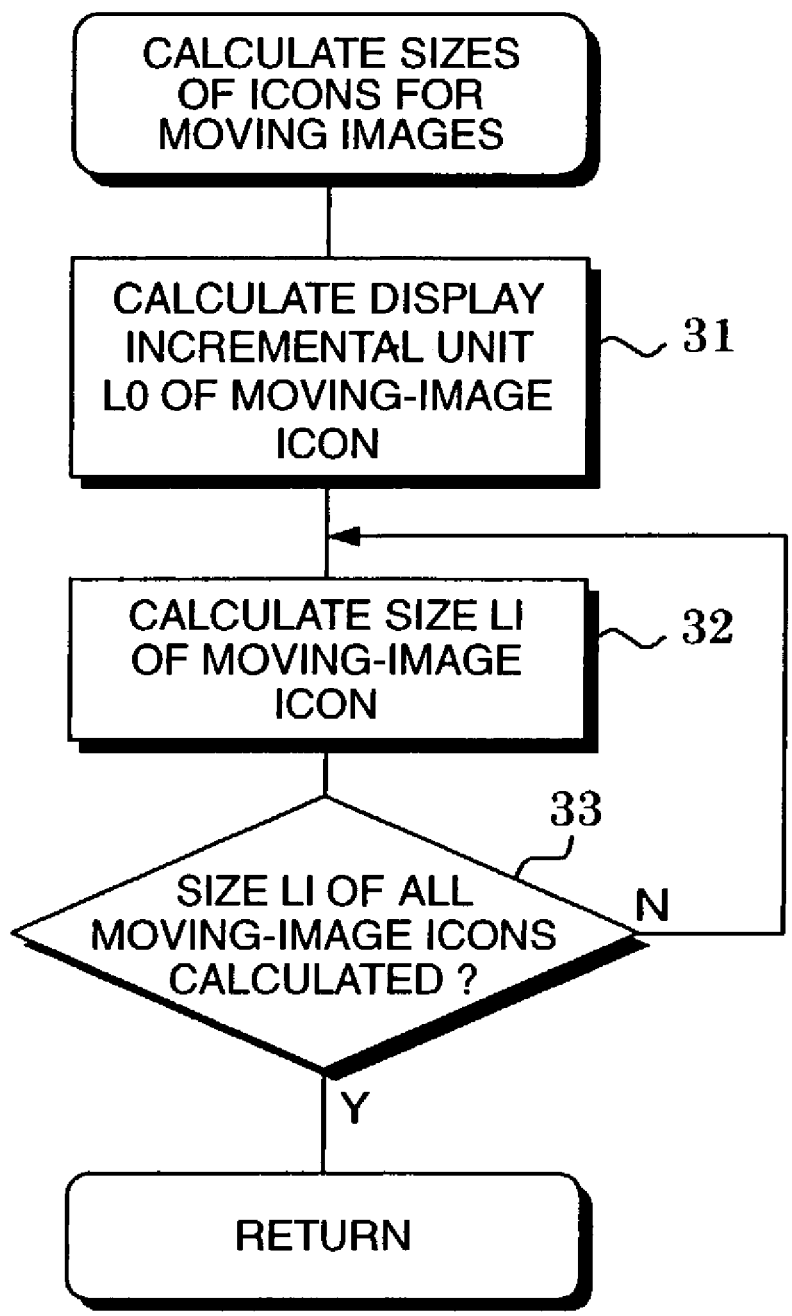
FIG. 6 is a flowchart illustrating processing for calculating icon size for a moving image.

FIG. 6 is a flowchart (of the processing of step 25 in FIG. 3) illustrating processing for calculating moving-image icon size.

Processing for calculating horizontal size of the rectangle on the front side of a moving-image icon will now be described. It will readily be understood that vertical size of the rectangle and length in the depth direction can be calculated in a similar manner.

In the processing for calculating moving-image icon size, first an incremental unit L0 for displaying a moving-image icon is calculated based upon the following equation (step 31):

$$L0=(H\max-H\min)/(S-1) \quad (1)$$

where Hmax represents the maximum value of the numbers of pixels in the horizontal direction of all image sizes calculated as set forth above, Hmin the minimum value of the numbers of pixels in the horizontal direction of all image sizes calculated as set forth above, and S the number of display steps. (The number of display steps indicates the number of steps it takes to make the change from the minimum value to the maximum value. The number of display steps may be any suitable value, e.g., 11.)

Next, size LI of a moving-image icon is calculated based upon the following equation (step 32):

$$LI=1+(Hx-H\min)/L0 \quad (2)$$

where Hx represents the number of pixels in the horizontal direction of image size of a moving image identified by a moving-image icon for which size LI is to be calculated (in this case, the size LI is the horizontal size of the rectangle of the moving-image icon).

The processing of step 32 is repeated until the size LI has been calculated for all of the moving-image icons (step 33).

By way of example, the numbers of pixels in the horizontal direction of the image sizes of the five moving-image files are 320, 240, 400, 420 and 400, among which the maximum and minimum values are 420 and 240, respectively. If the number S of display steps is assumed to be 11, the unit L0 of display will be L0=(420−240)/(11−1)=18 (pixels) based upon Equation (1). By using the unit L0 of display and Equation (2), horizontal sizes L1 to L5 of the rectangles R1 to R5 of moving-image icons 41 to 45 are calculated to be as follows:

$$L1=1+(320-240)/18=5$$

$$L2=1+(240-240)/18=1$$

$$L3=1+(400-240)/18=10$$

$$L4=1+(420-240)/18=11$$

$$L5=1+(400-240)/18=10$$

In other words, if the horizontal size of rectangle 52 of moving-image icon L2 is made "1", then the horizontal sizes of the rectangles 51, 53, 54 and 55 of moving-image icons 41, 43, 44 and 45 will be "5", "10", "11" and "10".

Similarly, consider playback time (length of a moving-image icon in the depth direction). Since the playback times of the five moving-image files are 90, 120, 150, 200 and 300 seconds, the minimum and maximum values are 90 and 300 seconds, respectively. If the number of display steps is 11, then we will have display unit L0=(300−90)/(11−1)=21 (seconds). By utilizing this unit of display and performing calculation in a manner similar to that of Equation (2), the length of the moving-image icon in the depth direction becomes a reference length "1" and the lengths of the moving-image icons 42, 43, 44 and 45 in the depth direction become "2", "3", "6" and "11", respectively.

Thus, the sizes of moving-image icons are decided in accordance with the number of display steps using as a reference the maximum and minimum values of the moving-image icons as a reference. As a result, the relative characterizing features of the moving-image files among all moving images can be ascertained at a glance.

Lightness also can be considered in the same fashion. That is, it will suffice to take the maximum value of moving-image file sizes as being black, take the minimum value of moving-image file sizes as being white and divide up lightness from black to white in dependence upon the number of display steps. Further, compression rate (frame rate) can be reflected in the moving-image icons. In the case of compression rate as well, shape (size) or lightness (color) of moving-image icons can be decided based upon the maximum and minimum compression rates.

In the above-described embodiment, all moving-image files that have been stored on the hard disk 10 are treated as files for which moving-image icons are generated. However, it may be so arranged that moving-image icons are generated for selected moving-image files only. Further, it goes without saying that moving-image icons can be generated not only for moving-image files stored on the hard disk 10 but also for moving-image files stored in peripheral devices (digital cameras, storage devices, etc.) connected to a computer system.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for generating icons for moving images, comprising:
    a decision device that decides a shape and a color of each of a plurality of moving-image icons of a plurality of moving-image files based upon the plurality of moving-image files and a maximum size and a minimum size among sizes of images of frames constituting moving images representing moving-image data that has been stored in said plurality of moving-image files; and
    a generating device that generates data representing a moving-image icon having the shape and color decided by said decision device,
    wherein said decision device decides the shape and the color of the plurality of moving-image icons based upon said moving-image data stored in said plurality of moving-image files identified by said moving-image icons and moving-image data stored in other moving-image fires,
    wherein said moving-image icons comprise a rectangular cube shape and said decision device decides a dimension of at least one side of the rectangular cube shape based upon a playback time,
    wherein said color comprises a degree of lightness, the degree of lightness of said each of a plurality of moving-image icons being decided by the size of the moving image file, and
    wherein said decision device decides a horizontal size LI based upon LI=I+(Hx−Hmin)/L0, wherein L0 is an incremental value equal to (Hmax−Hmin)/(S−1),
    where Hmax represents a maximum value of a number of pixels in the horizontal direction of all image sizes of all moving-image files, Hmin represents a minimum value of a number of pixels in the horizontal direction of all image sizes of all moving-image files, S represents a number of steps it takes to make a change from the minimum value to the maximum value, and Hx represents a number of pixels in the horizontal direction of image size of a moving image identified by a moving-image icon for which size LI is to be calculated.

2. The apparatus according to claim 1, wherein said decision device decides said at least one of the shape and the color of said each of a plurality of moving-image icons based on a size of said frames constituting said moving images.

3. The apparatus according to claim 1, wherein said decision device decides a length of a first side of said rectangular cube shape moving-image icons based upon a number of horizontally directed pixels of each frame constituting said moving-image, said decision device decides a length of a second side of said rectangular cube shape moving-image icons based upon a number of vertically directed pixels of each frame constituting said moving-image, and said decision device decides a depth of said rectangular cube shape moving-image icons based upon a playback time.

4. The apparatus according to claim 1, wherein said decision device decides a first dimension of said moving-image icons based upon a number of horizontally directed pixels of each frame constituting said moving-image, said decision device decides a second dimension of said moving-image icons based upon a number of vertically directed pixels of each frame constituting said moving-image, and said decision device decides a third dimension of said moving-image icons based upon a playback time.

5. The apparatus according to claim 1, wherein the degree of lightness is indicated by hatching.

6. An apparatus for generating icons for moving images, comprising:
a decision device that decides a shape and a color of each of a plurality of moving-image icons of a plurality of moving-image files based upon the plurality of moving-image files and a maximum compression rate and a minimum compression rate among rates of moving-image data that has been stored in said plurality of moving-image files; and
a generating device that generates data representing a moving-image icon having the shape and color decided by said decision device,
wherein said decision device decides the shape and the color of the plurality of moving-image icons based upon said moving-image data stored in said plurality of moving-image files identified by said moving-image icon and moving-image data stored in other moving-image files,
wherein said moving-image icons comprise a rectangular cube shape and said decision device decides a dimension of at least one side of the rectangular cube shape based upon a playback time,
wherein said color comprises a degree of lightness, the degree of lightness of said each of a plurality of moving-image icons being decided by the size of the moving image file, and
wherein said decision device decides a horizontal size LI based upon $LI=I+(Hx-Hmin)/L0$, wherein L0 is an incremental value equal to $(Hmax-Hmin)/(S-1)$,
where Hmax represents a maximum value of a number of pixels in the horizontal direction of all image sizes of all moving-image files, Hmin represents a minimum value of a number of pixels in the horizontal direction of all image sizes of all moving-image files, S represents a number of steps it takes to make a change from the minimum value to the maximum value, and Hx represents a number of pixels in the horizontal direction of image size of a moving image identified by a moving-image icon for which size LI is to be calculated.

7. The method according to claim 6, wherein a length of a first side of said rectangular cube shape of said moving-image icons is decided based upon a number of horizontally directed pixels of each frame constituting said moving-image, a length of a second side of said rectangular cube shape of said moving-image icons is decided based upon a number of vertically directed pixels of each frame constituting said moving-image, and a depth of said rectangular cube shape of said moving-image icons is decided based upon a playback time.

8. A method of generating icons for moving images, comprising:
deciding a shape and a color of each of a plurality of moving-image icons of a plurality of moving-image files based upon the plurality of moving-image files and at least one of a compression rate of moving-image data stored in said plurality of moving-image files and an image size of images of frames constituting moving images representing moving-image data stored in said plurality of moving-image files and moving-image data stored in other moving-image files; and
generating data representing a moving-image icon having the shape and the color decided by said deciding at least one of the shape and the color,
wherein said moving-image icons comprise a rectangular cube shape and a dimension of at least one side of the rectangular cube shape is decided based upon a playback time,
wherein said color comprises a degree of lightness, the degree of lightness of said each of a plurality of moving-image icons being decided by the size of the moving image file, and
deciding a horizontal size LI based upon $LI=I+(Hx-Hmin)/L0$, wherein L0 is an incremental value equal to $(Hmax-Hmin)/(S-1)$,
where Hmax represents a maximum value of a number of pixels in the horizontal direction of all image sizes of all moving-image files, Hmin represents a minimum value of a number of pixels in the horizontal direction of all image sizes of all moving-image files, S represents a number of steps it takes to make a change from the minimum value to the maximum value, and Hx represents a number of pixels in the horizontal direction of image size of a moving image identified by a moving-image icon for which size LI is to be calculated.

9. An apparatus for generating icons for moving images, comprising:
a decision device that decides a shape and a color of each of a plurality of moving-image icons of a plurality of moving-image files based upon moving-image data stored in said plurality of moving-image files identified by said moving-image icon and moving-image data stored in other moving-image files; and
a generating device that generates data representing a moving-image icon having the shape and color decided by said decision device,
wherein said moving-image icon comprises a rectangular cube shape and said decision device decides a dimension of at least one side of the rectangular cube shape based upon a playback time,
wherein said color comprises a degree of lightness, the degree of lightness of said each of a plurality of moving-image icons being decided by the size of the moving image file, and
wherein said decision device decides a horizontal size LI based upon $LI=I+(Hx-Hmin)/L0$, wherein L0 is an incremental value equal to $(Hmax-Hmin)/(S-1)$,
where Hmax represents a maximum value of a number of pixels in the horizontal direction of all image sizes of all moving-image files, Hmin represents a minimum value of a number of pixels in the horizontal direction of all image sizes of all moving-image files, S represents a number of steps it takes to make a change from the minimum value to the maximum value, and Hx represents a number of pixels in the horizontal direction of image size of a moving image identified by a moving-image icon for which size LI is to be calculated.

10. The apparatus according to claim 9, wherein said deciding at least one of the shape and the color is decided based on a size of said icon.

11. The apparatus according to claim 9, wherein a length of a first side of said rectangular cube shape of the icon is decided based upon a number of horizontally directed pixels of each frame constituting said moving-image, a length of a second side of said rectangular cube shape of the icon is decided based upon a number of vertically directed pixels of each frame constituting said moving-image, and a depth of said rectangular cube shape of the icon is decided based upon a playback time.

12. The apparatus according to claim 9, wherein said deciding at least one of a shape and a color of each of a plurality of moving-image icons of a plurality of moving-image files is based upon the plurality of moving-image files and at least one of a maximum size and a minimum size among sizes of images of frames constituting moving images representing moving-image data that has been stored in said plurality of moving-image files and a maximum compression rate and a minimum compression rate among rates of moving-image data that has been stored in said plurality of moving-image files.

* * * * *